Oct. 2, 1962   J. W. M. STEEMAN   3,056,837
PROCESS FOR PREPARING HEXAMETHYLENEDIAMINE
Filed April 24, 1959
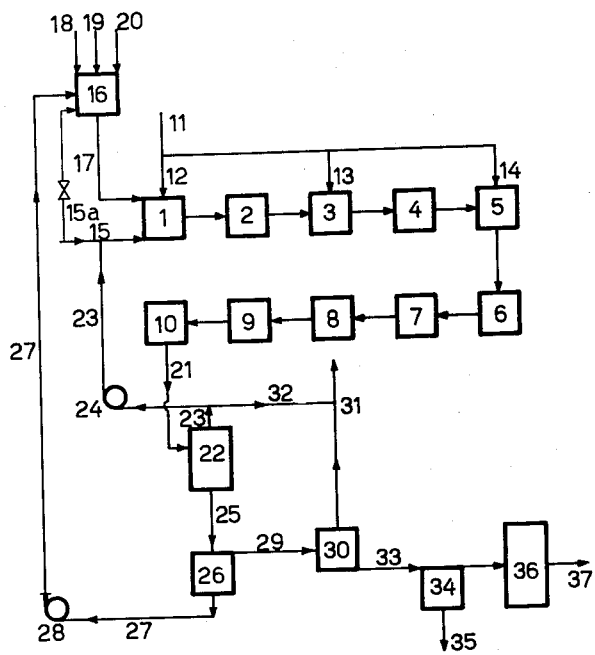
JOHANNES W. M. STEEMAN
BY: Cushman, Darby & Cushman
ATTORNEYS

United States Patent Office 3,056,837
Patented Oct. 2, 1962

3,056,837
PROCESS FOR PREPARING HEXAMETHYLENE-
DIAMINE
Johannes W. M. Steeman, Beek, Netherlands, assignor to
Stamicarbon N.V., Heerlen, Netherlands
Filed Apr. 24, 1959, Ser. No. 808,683
4 Claims. (Cl. 260—583)

The present invention relates to the hydrogenation under elevated pressure of adiponitrile or ε-aminocapronitrile to hexamethylenediamine by means of finely divided Raney catalyst.

The expression "finely divided Raney catalyst" as used herein is intended to embrace the usual type of Raney catalyst, e.g. Raney nickel, Raney cobalt, or Raney nickel mixed with chromium, etc., which is used as a suspension in a liquid, typically ethanol containing the compound to be hydrogenated.

As is well known, the Raney catalysts are comparatively expensive. For this reason, it is in most cases desirable to recover the Raney catalyst for reuse by filtration from the reaction product. However, due to its previous use, the activity and selectivity of the recovered Raney catalyst is diminished to a more or less extent, depending on the nature of the compound that has been hydrogenated and on the impurities which this compound unavoidably contains in a commercial process. By "activity" is to be understood the measure in which a unit weight of catalyst causes hydrogen take-up in a given hydrogenation reaction. By "selectivity" is meant the efficiency which is reached in the hydrogenation due to the influence of the catalyst. Due to the decline in activity and/or selectivity, it is necessary after the reaction to expel at least part of the amount of catalyst used and to supply an amount of fresh catalyst.

The principal object of the present invention is to provide a process wherein a smaller consumption of catalyst per kilogramme of hexamethylenediamine produced is involved, while at the same time obtaining hexamethylenediamine of high quality. Other more specific objects will also be apparent.

According to the invention, the hydrogenation of adiponitrile or ε-aminocapronitrile is carried out in the liquid phase and at elevated pressure by means of a gas containing hydrogen and a finely divided Raney catalyst, in one or more steps, in such a way that an amount of the compound to be hydrogenated is added to Raney catalyst which is still suspended in at least part of the liquid which has been obtained in a previous hydrogenation, or in a step thereof, the liquid being still under hydrogen pressure, i.e. having a partial hydrogen pressure of at least 1 atm.

It is advantageous to take care that the liquid in which the Raney actalyst is left suspended is under the pressure used in the hydrogenation process concerned. This may be between 20 and 75 atmospheres although pressure outside this range may be used.

The compound to be hydrogenated may be added as such to the catalyst suspension or the compound may be mixed with a diluent, e.g. an alcohol, such as ethanol or hexamethylenediamine. Alternatively, the compound may be preliminarily mixed with an amount of the catalyst or, e.g. a base, such as sodium hydroxide as is usual in the hydrogenation of nitriles.

If a compound has been sufficiently hydrogenated, either in a continuous or in a discontinuous way, the process according to the invention may be carried out by separating from the resulting reaction product a suspension which contains all or part of the Raney catalyst present in the reaction product and adding a fresh amount of the compound to be hydrogenated to this suspension rich in catalyst while the suspension is still under hydrogen pressure. This procedure entails the advantage that the activity and/or selectivity of the Raney catalyst are decreased to a much less extent than if the catalyst had been filtered and depressurized by the method used so far. The recycled catalyst will usually comprise from 60 to 80% by weight of the catalyst in the feed. The amount of adiponitrile or ε-aminocapronitrile added to this suspension may be widely varied but preferably comprises between 25 and 75% by weight of the total material to be hydrogenated.

Separating off the catalyst-rich suspension may be done by passing the reaction product through a thickener, e.g. a cyclone, or through a magnetic separator. In this way, the used catalyst is obtained as an easily flowing suspension under hydrogen pressure rather than as a paste, as is the case of filtration is applied.

The method according to the invention may also be applied to a hydrogenation process carried out in more than one step. This may be accomplished by adding an amount of the compound to be hydrogenated to one or more of the steps after the first step. Thus, for example, an amount of the compound to be hydrogenated may be fed, into the third step of a 10-step continuous hydrogenation process. Such addition may amount to from 10 to 50% by weight of the total amount of compound to be hydrogenated. In this embodiment, it will be appreciated that the compound is added to an amount of catalyst which is present in the suspended state in liquid that is under the full pressure required for hydrogenation, so that this catalyst has lost very little in activity and selectivity. It is remarkable that the capacity of a given hydrogenation plant, i.e. the amount of compound which can be hydrogenated in this plant per hour, does not drop off if, for instance, one third of the amount of compound to be hydrogenated is supplied to the third step and another third is fed to the fifth step, instead of the whole amount being fed into the first. Actually, it has been found that the capacity of the hydrogenation plant even shows an increase with such an arrangement.

The invention is further explained with reference to the accompanying diagrammatic drawing of a preferred arrangement for carrying out the process of the invention.

Referring more particularly to the drawing, the hydrogenation plant comprises the series-connected autoclaves identified by the numerals 1–10. The compound to be hydrogenated, which if desired may have been pretreated with fresh or spent Raney catalyst at room temperature or at a higher temperature, is fed from conduit 11 to autoclaves 1, 3 and 5 through conduits 12, 13 and 14. Into autoclave 1, a conduit 15 feeds hydrogen while through conduit 17 there is fed a suspension of catalyst in product previously hydrogenated from storage tank 16, in which an atmosphere of hydrogen is kept by furnishing hydrogen through line 15ª. Conduit 18 is used to feed catalyst makeup into storage tank 16 while an appropriate solvent, e.g. product already hydrogenated, or ethyl alcohol may be fed through conduit 19 and catalyst promoter, e.g. sodium hydroxide supplied through conduit 20. If desired, the fresh catalyst may be supplied at a later stage of the hydrogenation process, e.g. to autoclave 10.

The catalyst is kept in suspension it autoclaves 1–10. This may be done by stirring the autoclaves, e.g. by means of a propeller-type stirrer, a turbine stirrer or a plunger-type agitator, or by leading the hydrogen through the autoclaves at a sufficiently high rate. The autoclaves are further equipped with cooling jackets (not shown in the drawing) by means of which the temperature can be controlled.

The mixture issuing from the last autoclave 10 is passed through a conduit 21, a heat exchanger (not shown in the drawing) in which the mixture gives off its heat to the liquid flowing through conduit 17 and into a gas-liquid separator 22. Gas, i.e. hydrogen, separated off at separator 22 is returned to autoclave 1 through a conduit 23, circulation compressor 24 and another conduit 15. The liquid, containing catalyst and the desired hydrogenation product, which issues from the gas-liquid separator 22 is passed through a conduit 25 into a thickener 26. The latter may be, for example, a cyclone or a magnetic separator. From the thickener, a catalyst suspension is sent through conduit 27 and pump 28 to the storage vessel 16.

The liquid issuing from the thickener 26, which contains only little catalyst, is sent through a conduit 29 to an expansion vessel 30 provided with a gas discharge conduit 31. Another conduit 32 debouches into conduit 31 through which part of the gas flowing through conduit 23 is vented. The liquid flowing out of the expansion vessel is passed through a conduit 33 to a filter plant 34, which is equipped with a drain 35 through which catalyst is drained, if necessary after washing. By preference, such a part of the reaction product is directly passed through a conduit (not shown in the drawing) from the gas-liquid separator 22 to the expansion vessel 30, that the whole amount of catalyst that has to be drained is removed through this catalyst drain 35. If this is not done, part of the suspension flowing through conduit 27 is drained through a special conduit (not shown in the drawing). The liquid flowing out of the filter plant 34 is led, if necessary, to a distillation apparatus 36, consisting of one or more distillation columns, from which hydrogenated compound of the desired degree of purity is obtained through a conduit 37.

The invention is further illustrated but not limited by the following example:

Into the first of a series of 10 autoclaves, as shown in the drawing, ε-aminocapronitrile was introduced at the rate of 10 litres/hour, ethyl alcohol at the rate of 20 l./h., Raney nickel at the rate of 0.5 kg./h. and NaOH at the rate of 0.1 kg./h. Into each of autoclaves 3 and 5, additional ε-aminocapronitrile was fed at the rate of 10 l./h. Into autoclave 1, a mixture of hydrogen and nitrogen was fed at such a high pressure (50–60 atm.) that the partial hydrogen pressure was about 40 atm. The temperature of the autoclaves was maintained at 70–75° C. The liquid volume of each autoclave was about 7 litres.

The product coming from autoclave 10 was fed into the gas-liquid separator 22. Part of the gas thereby released was sent back through conduit 23 and the rest was drained through conduit 32, so that the hydrogen content of the gas entering autoclave 1 averaged 70%.

The liquid issuing from the gas-liquid separator 22 was immediately sent to the expansion vessel 30 and on to the filter plant 34. After water, obtained in the catalyst washing to be mentioned hereafter, had been added to the filtrate, this filtrate was passed on to a series of distillation columns 36 in which alcohol, homopiperidine, other byproducts, and water were removed, while the hexamethylenediamine was distilled.

The amount of hexamethylenediamine, in completely purified form, was 96 mol percent, based on the ε-aminocapronitrile originally fed into the autoclaves. This product could be converted by means of adipic acid into nylon salt which completely satisfies the high purity demands to be made on it, even if the formation of the salt takes place not in an alcoholic but in an aqueous medium.

The catalyst paste coming from the filter plant was washed with water, after which the selectivity of the catalyst was determined by using it in a small scale hydrogenation of ε-aminocapronitrile at the temperature and pressure used in the process above described, and measuring the efficiency. The efficiency was found to be only 75%, which means that the catalyst could not be used any longer. The selectivity of the catalyst from autoclave 10, which catalyst was kept in suspension under hydrogen pressure, was practically unchanged and amounted to about 96%. Its activity had dropped to about 80% of that of the fresh catalyst. This makes it possible considerably to reduce the catalyst consumption which in the process described above was 1.7% of the total amount of ε-aminocapronitrile fed in by recycling part of the catalyst suspension through the thickener 26. If, for instance, 60% of the catalyst suspension is recycled through thickener 26, the consumption of fresh catalyst need not be higher than 0.9% by weight with respect to the total amount of ε-aminocapronitrile fed in.

If, under otherwise equal conditions, the total amount (30 litres per hour) of ε-aminocapronitrile is supplied to autoclave 1, the hexamethylenediamine yield is not 96 mol. percent but only about 50 mol. percent. If a yield of 96 mol. percent is to be obtained, it is necessary to add as much as about 5% by weight of catalyst with respect to the nitrile fed in.

It will be appreciated that various modifications may be made in the invention described herein without deviating from the scope thereof as defined in the following claims.

I claim:

1. In a process for preparing hexamethylenediamine by the catalytic hydrogenation of a nitrile starting material selected from the group consisting of adiponitrile and ε-aminocapronitrile in the liquid phase and at pressures within the range of 20 atmospheres to 75 atmospheres using a finely divided metal catalyst selected from the group consisting of Raney nickel and Raney cobalt, the improvement of: carrying out said hydrogenation process in a hydrogenation region which includes at least one hydrogenation zone; discharging from this region a suspension of the catalyst in hydrogenation reaction product; maintaining the thus discharged suspension under hydrogen pressure; separating part of the hydrogenation product from said discharged suspension; recycling the resulting suspension into said hydrogenation region; and adding further starting material to said recycled suspension before the same is delivered to said hydrogenation region.

2. The process of claim 1 wherein the discharged suspension is kept under a hydrogen pressure equal to that used in the hydrogenation reaction.

3. The process of claim 1 wherein the hydrogenation is carried out in a plurality of interconnected zones and said further starting material is added to a suspension discharged from the first zone into the next zone.

4. The process of claim 1 wherein from 25 to 75% by weight of said starting material is added to said recycled suspension.

References Cited in the file of this patent

UNITED STATES PATENTS

| | | |
|---|---|---|
| 2,166,152 | Howk | July 18, 1939 |
| 2,166,183 | Signaigo | July 18, 1939 |
| 2,449,036 | Grunfeld | Sept. 7, 1948 |
| 2,776,315 | Jefferson et al. | Jan. 1, 1957 |